United States Patent
Rakhmilevich et al.

(10) Patent No.: US 11,042,471 B2
(45) Date of Patent: Jun. 22, 2021

(54) SYSTEM AND METHOD FOR PROVIDING A TEST MANAGER FOR USE WITH A MAINFRAME REHOSTING PLATFORM

(71) Applicant: Oracle International Corporation, Redwood Shores, CA (US)

(72) Inventors: Mark Rakhmilevich, San Jose, CA (US); Weixuan (Wade) Zhang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/110,173

(22) Filed: Aug. 23, 2018

(65) Prior Publication Data

US 2019/0065351 A1  Feb. 28, 2019

Related U.S. Application Data

(60) Provisional application No. 62/550,405, filed on Aug. 25, 2017.

(51) Int. Cl.
*G06F 11/36* (2006.01)
*G06F 9/48* (2006.01)

(52) U.S. Cl.
CPC ........ *G06F 11/3684* (2013.01); *G06F 9/4856* (2013.01); *G06F 11/3664* (2013.01); *G06F 11/3688* (2013.01); *G06F 11/3692* (2013.01)

(58) Field of Classification Search
CPC ....... G06F 11/36–3696; G06F 8/60–66; G06F 9/4856

See application file for complete search history.

(56) References Cited

U.S. PATENT DOCUMENTS

| 5,678,044 A | 10/1997 | Pastilha |
| 6,006,277 A | 12/1999 | Talati |

(Continued)

OTHER PUBLICATIONS

Anonymous, "Oracle Tuxedo Application Runtime for CICS and Batch", Oracle [online], 2012 [retrieved Jul. 5, 2019], Retrieved from Internet: <URL: https://www.oracle.com/technetwork/middleware/tuxedo/overview/oracle-art-c-b-12c-datasheet-1721261.pdf>, pp. 1-4.*

(Continued)

*Primary Examiner* — Todd Aguilera
(74) *Attorney, Agent, or Firm* — Tucker Ellis LLP

(57) ABSTRACT

In accordance with an embodiment, described herein is a system and method for providing a test manager for use with a mainframe rehosting platform. The test manager can run in a web server and is accessed through a web browser to run testing on multiple test machines. The test manager can be configured to automatically discover test units from a deployed migrated application and its artifacts, and organize the discovered test units into various test plans. The test manager can be used to capture a baseline from an online execution against a mainframe platform at the network data stream layer, and to drive both execution against the rehosting platform and automated comparison of the results. The test manager can further be configured to execute batch jobs against both the mainframe platform and the rehosting platform and compare the results from both platforms, to determine if the batch jobs results match.

20 Claims, 8 Drawing Sheets

(56) References Cited

U.S. PATENT DOCUMENTS

| | | | |
|---|---|---|---|
| 7,299,382 B2* | 11/2007 | Jorapur | G06F 11/3684 703/22 |
| 8,010,582 B2 | 8/2011 | Zimowski | |
| 8,341,631 B2 | 12/2012 | Havemose | |
| 8,448,146 B2* | 5/2013 | Pasala | G06F 11/3684 717/126 |
| 8,539,488 B1 | 9/2013 | Havemose | |
| 8,881,139 B1 | 11/2014 | Acacio | |
| 9,430,505 B2 | 8/2016 | Padmanabhan | |
| 9,483,387 B1* | 11/2016 | Allocca | G06F 11/3688 |
| 2003/0204784 A1* | 10/2003 | Jorapur | G06F 11/3684 714/38.14 |
| 2004/0194055 A1 | 9/2004 | Galloway | |
| 2007/0067771 A1 | 3/2007 | Kulbak | |
| 2012/0047492 A1 | 2/2012 | Huang | |
| 2012/0159427 A1 | 6/2012 | Oara | |
| 2012/0204149 A1 | 8/2012 | Joukov | |
| 2012/0254665 A1* | 10/2012 | Pasala | G06F 11/3684 714/33 |
| 2014/0068269 A1 | 3/2014 | Zhou | |
| 2017/0004060 A1 | 1/2017 | Kosuda | |
| 2017/0206119 A1 | 7/2017 | Zhang | |
| 2017/0206208 A1 | 7/2017 | Zhang | |
| 2017/0206245 A1 | 7/2017 | Zhang | |
| 2017/0206363 A1 | 7/2017 | Zhang | |

OTHER PUBLICATIONS

Ding, X., et al., "Splitter: A proxy-based Approach for Post-Migration testing of Web Applications", Proceedings of the 5th European Conf. on Computer Systems [online], 2010 [retrieved Jul. 5, 2019], Retrieved from Internet: <URL: https://web.njit.edu/~dingxn/papers/Splitter.pdf>, pp. 1-14.*

Morandi, B., et al., "Record—Replay Debugging for Concurrent SCOOP Programs" [online], 2011 [retrieved Jul. 8, 2019], Retrieved from Internet: <URL: http://citeseerx.ist.psu.edu/viewdoc/download?doi=10.1.1.420.3513&rep=rep1&type=pdf>, pp. 1-14.*

Jovanovikj, I., et al, Towards a Model-Driven Method for Reusing Test Cases in Software Migration Projects, Softwaretechnik-Trends, vol. 36, No. 2 [online], 2016 [retrieved Jun. 14, 2020], <URL:http://pi.informatik.uni-siegen.de/stt/36_2/01_Fachgruppenberichte/WSRE2016/WSRE2016_23_DFF_2016_paper_2.pdf>, pp. 1-2.*

Oracle®, An Oracle White Paper, Mainframe Rehosting Leveraging Oracle Tuxedo: Accelerating Cost Reduction and Application Modernization Jun. 2008, Updated Mar. 2009, 37 pages.

George Eadon et al., "Supporting Table Partitioning by Reference in Oracle", SIGMOD '08, Jun. 9-12, 2008, Vancouver, BC, Canada, Copyright 2008, 12 Pages.

Oracle, "Oracle Tuxedo Application Runtime for Batch, User Reference Guide 12c Release 1 (12.1.1)", Sep. 2013, Copyright © 2010, 2013, 156 Pages.

Oracle®, Oracle Tuxedo Application Runtime for Batch, User Guide 12c Release 2 (12.2.2), Apr. 2016, Copyright © 2010, 2016, 164 pages.

Unknown Author, "metaware, the complete IT modernization solution", Metaware French Social Security Mainframes Migrations Case Study 2002, 2 pages. http://www.metaware.fr/pdf/1_Metaware_French_Social_Security_Mainframes%20Migrations_Case_Study.pdf.

Micro Focus, Micro Focus Limited, "Micro Focus Product Review, Micro Focus Enterprise Test Server", ©2012 Micro Focus Limited, 6 pages. https://www.microfocus.com/media/guide/enterprise-test-server-product_tcm6-205420.pdf.

Joydipto Banerjee, Debasis Choudhuri, and LK Swift, "Accelerate to Green IT—A practical guide to application migration and rehosting", IBM Developer, Published on Jul. 16, 2012, 29 pages. https://www.ibm.com/developerworks/library/l-greenit/index.html.

* cited by examiner

SYSTEM AND METHOD FOR PROVIDING A TEST MANAGER FOR USE WITH A MAINFRAME REHOSTING PLATFORM

CLAIM OF PRIORITY

This application claims the benefit of priority to U.S. Provisional Patent Application titled "SYSTEM AND METHOD FOR PROVIDING A TEST MANAGER FOR USE WITH A MAINFRAME REHOSTING PLATFORM", Application No. 62/550,405, filed Aug. 25, 2017; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and application rehosting, and are particularly related to a system and method for providing a test manager for use with a mainframe rehosting platform.

BACKGROUND

To reduce costs and become as agile as possible, organizations today are increasingly seeking to move business-critical mainframe applications to rehosting platforms comprising open systems and/or cloud environments. However, to do so can often imply complex, costly and resource-heavy application migration projects, which deter companies from undertaking such migrations. Over the years, mainframe application rehosting has become a preferred option for many organizations for modernizing their mainframe legacy systems.

Mainframe rehosting projects can devote as much as 40% of the overall time and effort to testing the resultant application(s) in the target environment. Many factors contribute to the complexity and time it takes to complete the testing process for a large application or a portfolio consisting of multiple applications. Most mainframe applications have evolved over many years or decades, built and maintained by generations of development teams. Detailed knowledge of application behavior is often limited to the more recent changes, as documentation is often incomplete or not up-to-date, and the maintenance has been outsourced to an offshore group.

It would therefore be desirable to provide new and improved systems and methods for testing applications on a rehosting platform in order to reduce the time and complexity of migration of application from legacy mainframe environments to rehosting platforms comprising open systems and/or cloud environments.

SUMMARY

Described herein are new and improved systems and methods for testing applications on a rehosting platform in order to reduce the time and complexity of migration of application from legacy mainframe environments to rehosting platforms comprising open systems and/or cloud environments. In general terms, the test manager captures a baseline from an online execution against a mainframe platform at the network data stream layer and drives execution against the rehosting platform. The test manager can further be configured to execute batch jobs against both the mainframe platform and the rehosting platform. The test manager performs automated comparison of the results of execution on the mainframe platform and rehosting platform to determine if results match. Ideally a perfect match is indicative that the mainframe platform and rehosting platform are functioning identically. Any differences that are identified between the results of execution on the mainframe platform and rehosting platform can be used to inform the need for modifications to the rehosting platform to ensure proper operation of the mainframe applications after migration.

In accordance with an embodiment, described herein is a system and method for providing a test manager for use with a mainframe rehosting platform. The test manager can run in a web server and is accessed through a web browser to run testing on multiple test machines.

In accordance with an embodiment, the test manager is configured to generate test plans for testing a mainframe application that has been migrated to an open platform, such as ORACLE TUXEDO ART. The test manager runs in a web server and is accessible through a web browser. The test manager discovers asset-based test units (i.e., test cases) from a migrated application, and risk-based test units from one or more conversion rules that are applied to the migration process.

In accordance with an embodiment, the test manager discovers asset-based test units by scanning configuration files of the migrated application, and discovers risk-based test units using conversion rules extracted from code of the migrated mainframe application. The test manager can populate the test units (either asset-based or risk-based) into one of a plurality of test groups, each test group created for a particular type of runtime containers on the mainframe rehosting platform (e.g., Batch, CICS and IMS); and can organize the test units in each test group into one or more test scenarios. The test manager can link the one or more test scenarios into a test plan, and further link the test plan to a test execution driver, which can automatically execute the test plan against the migrated application in the open platform in response to the linking of the test plan to the test execution driver.

In accordance with an embodiment, the test manager can be further configured to execute a test plan for online applications migrated from a mainframe platform to an open platform (e.g., TUXEDO ART). The test manager can capture a baseline from an execution of an online application on the original mainframe platform at the network data stream layer, replay the captured baseline against the online application that has been migrated to the open platform, and determine the success by comparing test results from the mainframe platform and the open platform. The test manager can compare corresponding data streams and screens from both platforms, and automatically filter out screen fields that are expected to be different, thereby increasing test accuracy.

In accordance with an embodiment, the test manager is further configured to execute batch jobs against both the mainframe platform and the rehosting platform and compare the results from both platforms, including identifying output files, and downloading, converting, and comparing the output files automatically to determine if the batch jobs results match. In addition, database updates and return codes from the mainframe and migrated job can be compared to determine the migration success of a mainframe application or job.

The test manager thereby provides new automated testing features for the rehosting platform and improves the functionality, efficiency, and effectiveness of application migration and testing on the rehosting platform. These and other objects and advantages of the present invention will become apparent to those skilled in the art from the following description of the various embodiments, when read in light of the accompanying drawings.

DETAILED DESCRIPTION

Figure 1:
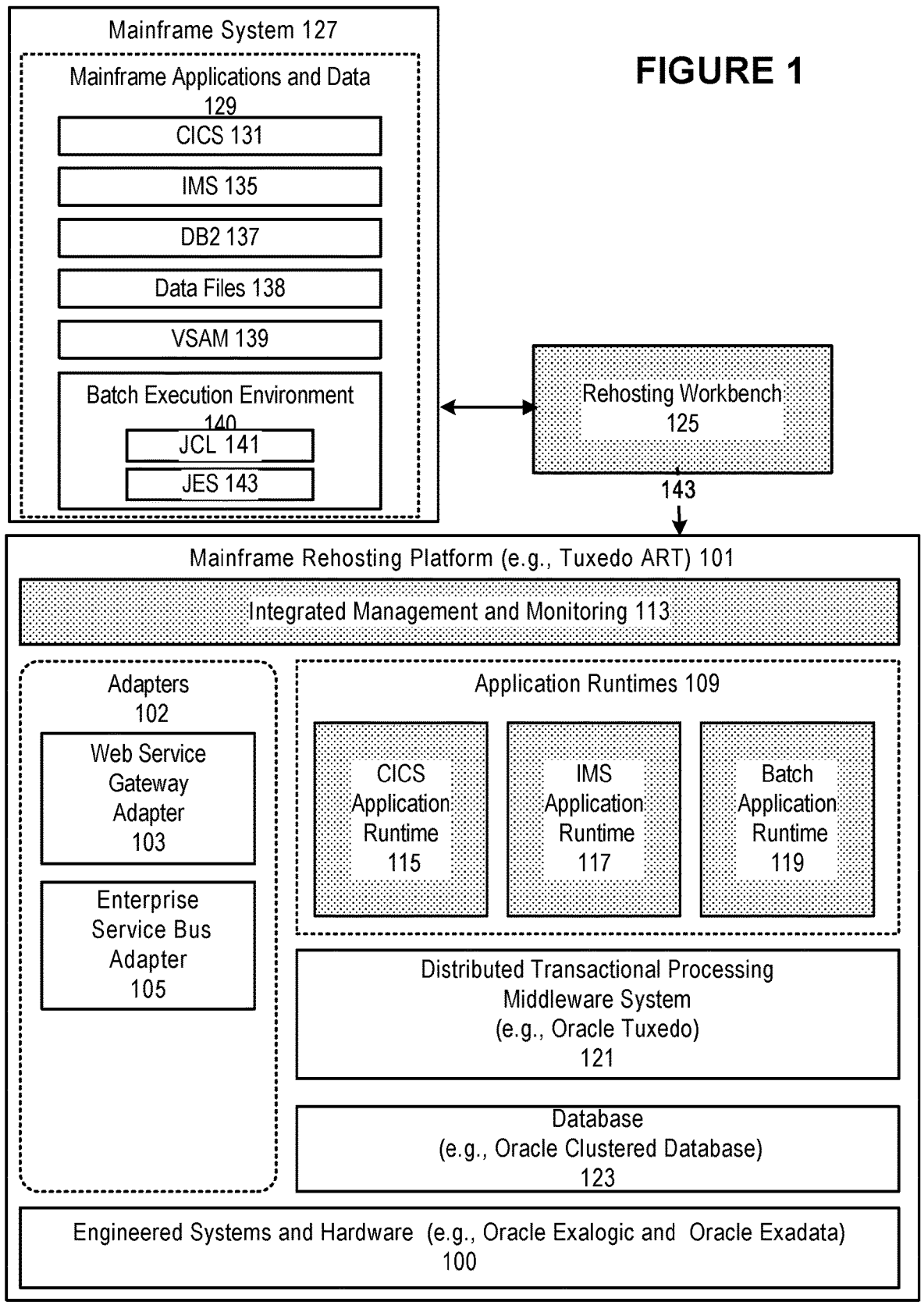
FIG. 1 illustrates an exemplary mainframe rehosting platform, in accordance with an embodiment.

Mainframe applications run on older architectures that were not built for the future. As companies face pressure to deliver more value from their IT spending, they are seeking to migrate their mainframe applications to an open platform, so as to unlock the value within the mainframe applications, to reduce total costs of ownership, and to deliver new functionality faster.

ORACLE TUXEDO Application Runtime (TUXEDO ART) is such an open platform. TUXEDO ART is powered by ORACLE TUXEDO (a COBOL and C/C++ application server) to emulate the functions of mainframe applications. A rehosting workbench can be used to facilitate migration of mainframe applications to TUXEDO ART without having to re-write them into another language (e.g., JAVA or .Net.).

Mainframe applications can be categorized into batch applications and online applications (interactive applications). Most mainframe applications have evolved over many years or decades, built and maintained by generations of development teams. Detailed knowledge of application behaviors is often limited to the more recent changes, as documentation is often incomplete or not up-to-date, and the maintenance has been outsourced to an offshore group.

As a result, it can be difficult to create a test plan that covers all functions and capabilities of a mainframe application that has been migrated to an open platform. Even with a good test plan, a significant amount of time and effort is needed to test the resultant rehosted applications in the target open platform.

In accordance with an embodiment, described herein is a system and method for providing a test manager for use with a mainframe rehosting platform. The test manager can be configured to generate test plans for testing a mainframe application that has been migrated to an open platform, such as ORACLE TUXEDO ART. The test manager can be further configured to execute a test plan for online applications migrated from a mainframe platform to an open platform (e.g., TUXEDO ART). The test manager can further be configured to execute batch jobs against both the mainframe platform and the rehosting platform and compare the results from both platforms, including identifying output files, and downloading, converting, and comparing the output files automatically to determine if the batch jobs results match. In addition, database updates and return codes from the mainframe and migrated job can be compared to determine the migration success of a mainframe application or job.

The system enables automatically discovery of test units from a deployed migrated application or conversion rules applied in the migration process of a mainframe application; and creation of test plans from the discovered test units, thereby saving users from creating test plans manually. Test plans generated using the features can cover all functions and capabilities of a migrated mainframe application without requiring detailed knowledge of the mainframe application, which can facilitate the testing of the migrated application.

The system enables rapid and efficient evaluation of test results and identification of potential issues by moving test efforts from a manual task to an automated process, thereby facilitating migration of online applications from a mainframe platform to an open platform. This feature also enables comprehensive testing of a migrated mainframe application without requiring detailed knowledge of the mainframe application from the tester.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Mainframe Rehosting Platform

FIG. 1 illustrates an exemplary mainframe rehosting platform, in accordance with an embodiment. As shown in FIG. 1, a mainframe rehosting platform 101 and a rehosting workbench 125 can provide a system for rehosting mainframe applications and data 129 on lower-cost platforms without losing business value or sacrificing Quality of Service (QoS).

The mainframe applications and data 129 to be rehosted can currently run on a mainframe system 127, for example, an IBM@ mainframe system; and includes a customer information control system (CICS) 131, an information management system (IMS) 135, a DB2 database 137, one or more data files (e.g., sequential files) 138, and a virtual storage access method (VSAM) file management system 139.

The CICS and the IMS can be middleware products on the mainframe system. The CICS is a heavy and rigid transaction processing management system designed to support rapid, high-volume online transaction processing. The IMS is a light-weight message-based transaction processing management system. The middleware products can be used to host business logic written in COBOL, PL/I, C, Assembly or 4GLs. The VSAM can comprise different file organizations which can be used by application programs to manage their data. The file organizations includes key sequenced data set key (KSDS), relative record data set (RRDS), entry sequenced data set (ESDS), and linear data set (LDS).

In addition, the mainframe system 127 includes a batch execution environment 140 that can support JOB Control Language (JCL) 141 and a job entry subsystem (JES) 143. JCL can be a script language to implement batch processes on the mainframe system. JES can be a major component of an operating system on the mainframe system, can receive jobs into the mainframe system, schedule the jobs for processing, and control their output processing.

As further shown in FIG. 1, the mainframe rehosting platform includes a software stack compatible with the mainframe system to run mainframe applications with little to no change to minimize the risks and cost of migration; and an integrated management and monitoring component 113 for use in monitoring the mainframe rehosting platform. The software stack can provide a set of mainframe-compatible functionalities to preserve CICS, IMS, and batch application logic and data.

The software stack includes a plurality of application runtimes (ART) 109 for hosting mainframe applications, for example, a CICS application runtime 115, an IMS application runtime 117, and a batch application runtime 119. The plurality of application runtimes and a rehosting workbench 125 can be used to migrate 143 the mainframe applications 129 from the mainframe system 127 to the mainframe rehosting platform 101.

The CICS application runtime includes a set of system servers to simulate core features of the mainframe CICS. The system servers can provide underlying application server functions, including cluster management, request routing, health monitoring, restarts, failover, load balancing, transaction management, communication channels and gateways (ATMI, CICS, IMS, SOAP/HTTP web services, JAVA/JCA, .Net, ESB), and protocol conversion.

The IMS application runtime can provide a set of DL/I calls for use by COBOL/C applications migrated from the mainframe system 127; a robust session environment to handle concurrent connections from a plurality of 3270 terminals; a robust execution environment to provide OLTP to process transaction codes received from the 3270 terminals via calling the migrated COBOL/C applications; and a DB plug-in on the mainframe rehosting platform.

The batch application runtime 119 includes a set of servers to simulate mainframe JES core features. For example, the batch application runtime can provide batch management and a plurality of JES functions (e.g., job queues, classes, priorities, and initiators).

The rehosting workbench can be used to automate code and data migration using migration tools in the rehosting workbench. The code and data includes COBOL programs, copybooks, BMS screens, JCL, and DB2 DDL. The code and data can be transferred from the mainframe system 127 to the rehosting workbench, which can parse source objects, calculate dependencies, generate metadata, and produce reports to indicate any missing objects or unused ones in the code and data.

In accordance with an embodiment, after the code and data are parsed, data migration tools for files and DB2 tables can run, followed by code migration tools for COBOL JCL. The code migration tools can apply sophisticated language processing to adapt COBOL code between compiler dialects, transform JCL, and adapt SQL calls for differences between DB2 and ORACLE DB. For data migration, the data migration tools can generate target schemas, including ORACLE DDL, in the mainframe rehosting platform 101, and can automate data reloading to the generated target schemas.

The rehosting workbench can be used in UNIX command line mode, and an Eclipse IDE graphical environment; and can generate system configuration files for the mainframe rehosting platform to facilitate configuration management and to simplify the deployment process.

The software stack can execute on a distributed transactional processing middleware system 121, for example, ORACLE TUXEDO. The distributed transactional processing middleware system can run on an open system environment, for example, UNIX, LINUX, or Windows. The distributed transactional processing middleware system includes a native distributed architecture to provide transaction manager features for IMS and CICS from the perspective of applications.

The distributed transactional processing middleware system can represent a transaction-oriented middleware, or an enterprise application server designed for high availability and to provide scalable applications to support transactions on various distributed systems.

Examples of the distributed transactional processing middleware system includes TUXEDO (Transactions for UNIX, Enhanced for Distributed Operation), a message-based communications system to distribute applications across various operating system platforms and databases.

TUXEDO allows messages to be queued to persistent or non-persistent storage (memory) for later processing or retrieval. An application-to-transaction monitor interface (ATMI) in TUXEDO can provide an interface that allows messages to be added to or read from queues. TUXEDO can pass service request messages between ATMI clients and servers through operating system (OS) inter-processes. In TUXEDO, requests are sent to named services, and TUXEDO uses memory based inter-process communication facilities to queue the requests to servers.

Rehosted mainframe applications can run as services, and can take advantage of SOA integration and enablement capabilities via a plurality of adapters 102, for example, a web service gateway adapter 103, and an enterprise service bus (ESB) adapter 105.

In accordance with an embodiment, rehosted/migrated applications can be configured to expose a plurality of service interfaces in legacy components via standard WSDLs, and to provide robust bi-directional web services gateway capabilities. For example, the web service gateway adapter 103, an example of which can be ORACLE Service Architecture Leveraging TUXEDO (SALT) adapter, can enable the rehosted applications to participate in SOA environments. In addition, the rehosted applications can also use the ESB adapter 105 with built-in TUXEDO Transport for heterogeneous messaging.

As further shown in FIG. 1, the distributed transactional processing middleware system can execute on an engineered system and hardware 100, such as ORACLE EXALOGIC and ORACLE EXADATA; and includes a clustered database 123, such as ORACLE REAL Application Clusters. The clustered database can support usage of multiple individual systems as one clustered, virtual database server; and can provide transparent synchronization of read and write accesses to databases shared by all nodes in a cluster, dynamic distribution of database workload, and transparent protection against systems failures.

In accordance with an embodiment, the system described above, by combining a distributed transactional processing middleware system, a clustered database, an engineered system, and a plurality of open system products, can provide required reliability, availability, scalability and performance to rehosted mainframe applications.

Test Manager

A test manager, such as ORACLE TUXEDO Application Rehosting Test Manager, is part of TUXEDO product family designed to automate and speed up testing in mainframe re-hosting projects.

Complementing TUXEDO ART Workbench, which provides tools for automating and speeding up the migration process, the test manager focuses on the remaining part of the re-hosting project, for example, testing the results. Its role is to enable customers to complete the application functional or regression testing more efficiently, faster, and with fewer resources, thus reducing overall project cost and speeding up time to value.

Identifying the scope of testing and defining a test plan, determining how to test the application and executing test scenarios can present a significant challenge in many rehosting projects. To help end users address these challenges, the testing can be driven by captured information, partly from the source analysis and generated migration artifacts and partly from capturing baseline test sequences and results from the mainframe execution.

A key benefit from capturing test scenarios on the mainframe is the ability to replay them on the target environment, and then to use captured results to compare with those generated on the target. Such automated comparison can help to speed up the evaluation of the test results and identification of potential issues, which can move the test effort from a manual, human-intensive task to an automated, industrialized process.

The test plans and automated test cases can also become a part of the ongoing regression test capability as migrated applications continue to change through ongoing maintenance and business evolution. For example, the test manager can provide load testing capabilities to create user-configurable stress tests based on the functional test cases that have passed successfully.

Figure 2:
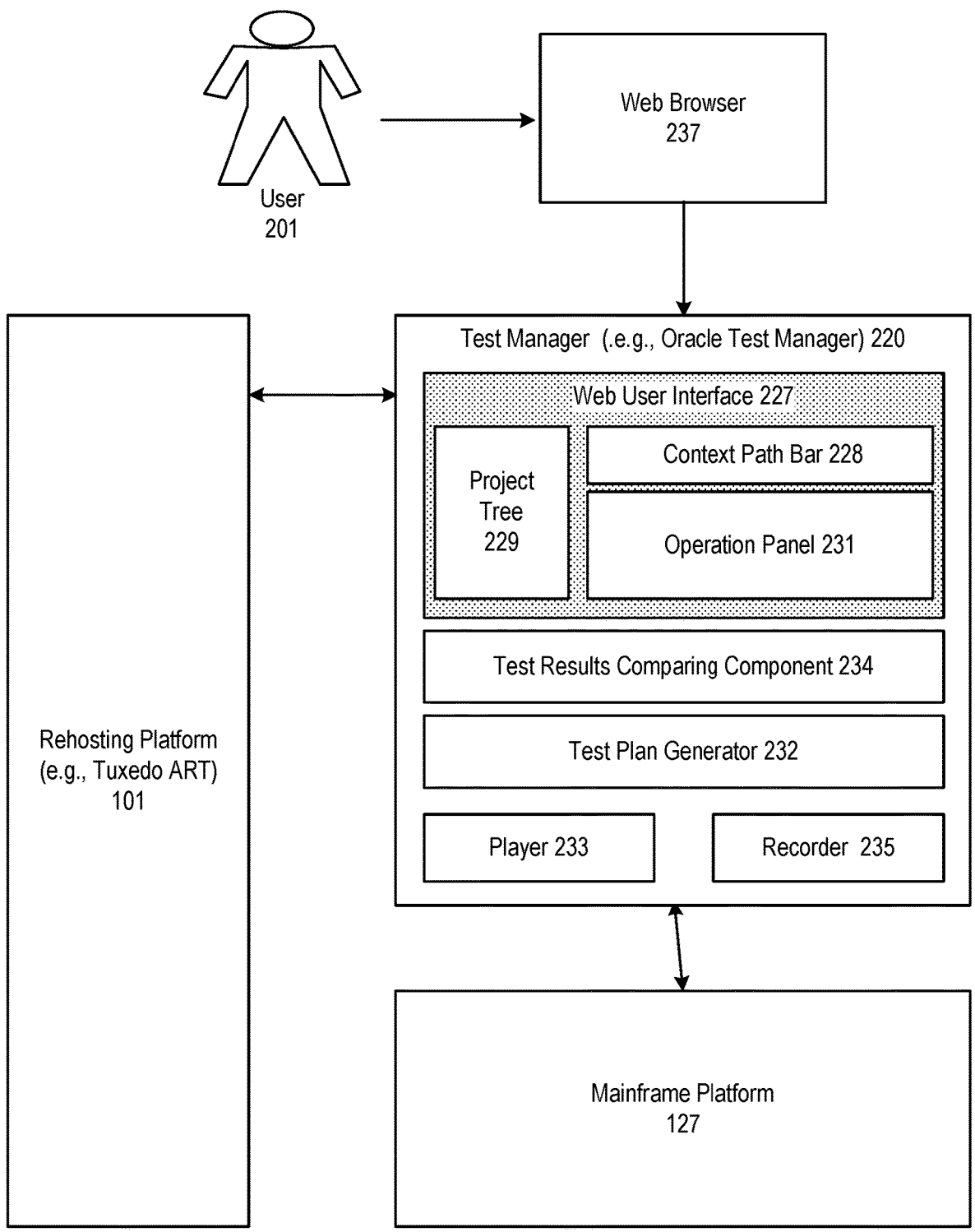
FIG. 2 illustrates an exemplary test manager for use with a mainframe rehosting platform, in accordance with an embodiment.

FIG. 2 illustrates an exemplary test manager, in accordance with an embodiment.

In accordance with an embodiment, a test manager 220 can run on a web server, and can be accessed by end users (e.g., user 201) through a web browser 237. The test manager can provide the end users with end-to-end capabilities from creating test plans to executing the test cases, capturing and comparing results, and providing a tracking dashboard.

In accordance with an embodiment, a web user interface (UI) 227 can be provided in the test manager for user interaction, and includes built-in features, such as authentication, access control, and auditing.

Users can interact with the test manager to perform the following tasks:

(1). Configure access to one or more test environments that have been deployed with the mainframe rehosting platform, for example, TUXEDO, relevant CICS, IMS, and Batch runtimes, migrated application components, and any dependencies (e.g., data files, DB clients, MQ client, etc.).

(2). Discover online and batch test case units for CICS or IMS transactions and batch jobs, and select relevant subsets to create test plans. Specify the execution order, upload baseline artifacts, configuration dependencies, and custom pre- and post-processing scripts. Test plans can also be filtered to focus on specific tests and extended to add additional custom test scenarios by users.

(3). Execute test plans on one or more configured test environments and capture results for automated comparison with the mainframe baseline. Built-in result comparison methods include 3270 screen and data stream comparisons for online CICS and IMS transactions and return codes, file; and database comparisons for batch jobs. These can also be extended with custom results verification scripts. Collected logs and traces can be reviewed to diagnose anomalies.

(4). Track status of test cases and test plans, and generate reports and dashboards. Review audit reports to see all user activity by project.

As further shown in FIG. 2, the web user interface can contain a plurality of panels, for example, a project tree panel 229, a context path bar panel 228, and an operation panel 231. The project tree panel can operate as a navigation bar that shows a project list owned by a current user, and the members of a selected project. The context path bar panel can contain a "Create project" button, which can be used to create a new project, and a current context path if a project is opened. The context path can contain a plurality of levels, for example, a project level, a group level, a plan level and a case level. The operation panel can show the content of a currently open object (project, group, plan, or case), and a group of buttons that are appropriate in the current context.

In accordance with an embodiment, a drop down menus in the web user interface can be provided to provide access to additional user management, e.g., software provisioning, system monitoring, dashboard, and auditing.

In accordance with an embodiment, a recorder 235 can be provided in the test manager to record the baseline of a user's online interactions with CICS or IMS applications on Z/OS and enable the test manager to replay these interactions automatically against rehosted applications running under ART for CICS or IMS, collecting responses and comparing them with the ones from Z/OS. This capability enables the test manager to completely automate the testing of the online screens in rehosted applications.

The recording can be performed by a recorder 235, and the replaying can be performed by a player 233, and the responses comparison can be performed by a test results comparing component 234.

In accordance with an embodiment, a test plan generator 232 can be used to scan the a deployed migrated application on the rehosting platform, and generate test plans for use in testing the migrated application Test Plan Generation The test manager can be configured to automatically discover test units from a deployed migrated application and its artifacts. The discovered units can subsequently be organized into various test plans. The test manager can further be configured to capture a sequence of jobs from a mainframe scheduler using a test driver, and then turn the job sequence into a test plan sequence for automatic execution against the rehosting platform.

The test manager can discover native JCL and converted KSH batch jobs in the deployed test environment, and import them into a batch test group.

To help automate test plan creation to reflect a correct flow of batch jobs, mainframe scheduler requests routed to a local agent can be captured by the test manager. The test plan can then be extended with custom pre-/post-execution scripts (e.g., for environment set up and clean up, data loading, etc.) and custom result check scripts for each test case.

In accordance with an embodiment, users can then link the test units into test scenarios that comprise a test plan. For example, one or more test units can be further linked into a test scenario, which can later be linked with a test execution driver. Test units can be derived from the application inventory analysis and break down into batch test units and online test units.

Batch test units: each corresponds to a batch job. These are further classified by standard batch or IMS batch type. It is represented by a template that gathers all of the information related to a batch job and includes sections related to the jobs' dependencies (programs, DB tables, etc.), input files, and outputs (files, DB updates.)

Online test units: each corresponds to a CICS or IMS transaction or screen map (BMS or MFS.) When configuring the test manager, users can specify if they want online test units generated based on transactions only, screen maps only, or both. Transaction and screen map test units can be represented by their respective templates that gather all the information related to the transaction or screen map; and includes dependencies, input conditions, and output results. Transactions can be further classified based on how they are started:

(1). Screen CICS or IMS transaction: terminal (e.g., tn3270) or other UI (CICS ECI, Web UI, etc.);

(2). CICS DPL initiated from JCA, Web Services, TMA, Batch EXCI API;

(3). CICS Async transaction initiated by MQ trigger, started by another CICS transaction, started from a batch job; and (4). IMS Async transaction initiated by MQ bridge, ATMI interfaces over ARTIGW.

For each case, the starting conditions can have a template that can be filled out with specific details (e.g., for MQ, the name of MQ manager, queue name, info on how messages can be simulated for testing; for web services, references to WS client driver and message definitions; and for batch job, name of the job/step and any data that needs to be passed).

For tn3270 screen-initiated transactions and screen-based test units, the template can specify the BMS map name, input fields, and actions (PFkeys).

In accordance with an embodiment, a risk-based testing approach can be used. A risk-based testing approach focuses on specific types of changes made by the conversion process rather than on a broad coverage in asset-based test units.

This is a more efficient type of testing, since instead of broadly testing all programs changed due to a specific rule, an end user can run one test unit to validate the application of the rule and sample the programs instead of exhaustively covering 100% of the asset.

Since each type of change can create specific risks, risk-based test units can be focused on the following types of changes introduced by the rehosting workbench:

(1). Conversion rules applied to COBOL programs and copybooks. Since each rule is named and clearly commented in the source, the rules can be extracted and sorted to create a global list of rules and then test units for each unique rule applied to the asset. Such test units can then use specific templates to define a test approach that validates each type of change (based on applied rule).

(2). JCL conversions are not clearly identified and commented like the COBOL ones. JCL conversion process can be reviewed to determine how best to extract the total set of rules applied, so that test units can be created based on that.

(3). File conversion: Changes introduced by File Converter create risks in the following areas: VSAM to RDBMS conversion as well as for any VSAM or flat file-to-file conversion using REDEFINES, OCCURS, or OCCURS DEPENDING ON mapping rules (discrimination rules and use options) in the mapper. Test units can be created based on these.

(4). DB conversion. While test units for each table would fall more under asset-based test units, the risk-based testing for DB conversion can focus more on verifying sequences and other types of DB objects created along with the tables.

The test manager can work standalone as well as provide value to users who use test automation tools, like ORACLE Test Manager, HP Quality Center, Micro Focus/Borland SILK Test, IBM RATIONAL TestManager, etc. For standalone use model, the format of the test plan can be a structured document that users can save and edit in MS Word, or an Eclipse/Web UI-based representation, an easy-to-implement set of views that include a hierarchical view (expandable tree structure) and a detailed view to edit fields in the templates. For integrated use model, users would import the test units generated to use in the $3^{rd}$ party tools.

Figure 3:
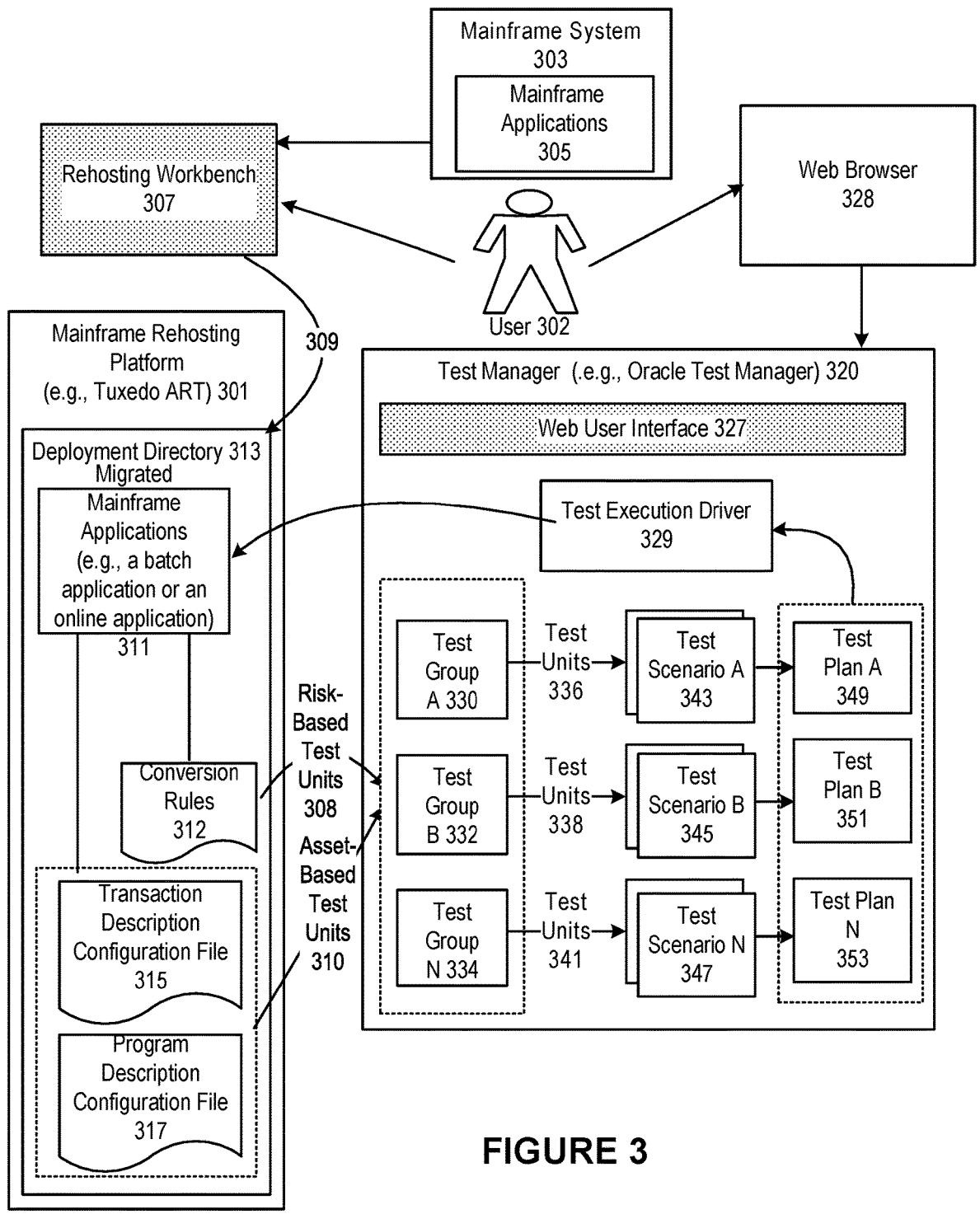
FIG. 3 illustrates a system for generating testing plans for testing a migrated application, in accordance with an embodiment.

FIG. 3 illustrates a system for generating testing plans for testing a migrated application, in accordance with an embodiment. As illustrated in FIG. 3 a test manager 320 can be provided between a web browser 328 and a mainframe rehosting platform (e.g., TUXEDO ART) 301. The mainframe rehosting platform can be powered by ORACLE TUXEDO, and provide a plurality of application runtimes (ART) for hosting a plurality of mainframe applications, for example, a customer information control system (CICS) application runtime, an information management system (IMS) mainframe application, and a batch application runtime.

The CICS application runtime includes a set of servers to simulate core features of the mainframe CICS. The servers provide cluster management, request routing, health monitoring, restarts, failover, load balancing, transaction management, communication channels and gateways (SOAP/HTTP web services), and protocol conversion.

The IMS application runtime can provide a set of Data Language/I (DL/I) calls for use by COBOL/C applications migrated from the mainframe system; a robust session environment to handle concurrent connections from a plurality of terminals (e.g., 3270 terminals); and a robust execution environment to process transaction codes received from the terminals.

The batch application runtime includes a set of servers to simulate mainframe job entry subsystem (JES) core features. For example, the batch application runtime can provide batch management and a plurality of JES functions (e.g., job queues, classes, priorities, and initiators).

In accordance with an embodiment, a rehosting workbench 307 can be used to automate migration of mainframe applications 305 using migration tools in the rehosting workbench, from a mainframe system 303 to the rehosting platform (open platform). The migrated artifacts includes code and data, for example COBOL programs, copybooks, basic mapping support (BMS) screens, job control language (JCL), and DB2 DDL. The code and data can be transferred from the mainframe system to the rehosting workbench, which can parse source objects, calculate dependencies, generate metadata, and produce reports to indicate any missing objects or unused ones in the code and data.

The rehosting workbench can generate 309 in a deployment directory 313 a plurality of configuration files 315, 317, for each of the migrated mainframe applications 311, from the CICS system definition of the mainframe application on the mainframe system.

The rehosting work bench can also generate in the deployment directory one or more conversion rules 312 used in migrating each mainframe application, for example, a rule for converting DB2 database definition language (DDL) scripts to ORACLE database DDL scripts.

The test manager can be configured to automate and speed up testing of the migrated mainframe applications. The test manager can run on a web server, and can be accessed by end users (e.g., user 302) through the web browser. The test manager can provide the end users with end-to-end capabilities, from creating test plans to executing test cases, capturing and comparing test results, and providing a tracking dashboard.

In accordance with an embodiment, a web user interface (UI) 327 can be provided in the test manager for user interaction, and includes built-in features, such as authentication, access control, and auditing.

Asset-Based Test Units

In accordance with an embodiment, asset-based test units are generated from artifacts of a migrated mainframe application. Once a rehosting project is created and associated with the deployment directory, the system can invoke the test manager to scan configuration files for each migrated mainframe application, and identify asset-based test units 310.

The asset-based test units includes batch test units and online test units. Each batch test unit can correspond to a batch job, and can be represented by a template that includes information for the batch job and its dependencies (e.g., DB tables), input files, and outputs (e.g., files, DB updates). Each online test unit can correspond to a CICS transaction or IMS transaction or a screen map. The end user can specify if online test units should be generated based on transactions only, screen maps only, or both. Transaction and screen map test units can be represented by their respective templates that include all information for the transaction or screen map, and their dependencies, input conditions, and output results.

Risk-Based Test Units

In accordance with an embodiment, risk-based test units 308 can be generated from conversion rules, which define specific types of changes to be made by the rehosting workbench when migrating and converting a mainframe application migration. Risk-based test units can be used for more efficient testing, since, instead of broadly testing all programs changed due to a specific rule, the test manager can use one such test unit to validate the application of the specific rule across all programs in the migrated mainframe application.

For example, when migrating a mainframe application, the test manager can apply a plurality of conversion rules to the source code of the main frame application, e.g., COBOL programs and copybooks.

Since each of the plurality of rules is named and clearly commented in the source code, the test manager can extract the conversion rules from the source code and sort the extracted conversion rules to create a global list of rules. The test manager can subsequently generate risk-based test units for each unique conversion rule.

Test Plan

In accordance with an embodiment, as used herein, a test project includes execution environments with all converted source code, configuration files, resource files, data files, etc., deployed by ART Workbench Plug-in.

In accordance with an embodiment, as used herein, a test group is an individual test environment, containing settings of one domain, and test plans and test cases. There can be a plurality of types of test group, for example, CICS, BATCH, and IMS). All test cases and test plans within one test group share the same execution environment.

In accordance with an embodiment, as used herein, a test plan is a logical container for multiple test cases, which can be used to organize testing based on subsystems or other logical parts of the application.

In accordance with an embodiment, as used herein, a test case is the smallest testing unit. For example, a CICS program, an IMS MPP transaction, an IMS BMP program, or a batch JCL job.

In accordance with an embodiment, after discovering the test units (risk-based test units and asset-based test units), the test manager can automatically populate them into one of a plurality of test groups, for example, test group A 330, test group B 332, and test group N 334.

In accordance with an embodiment, each test group can be a container for storing test units/test cases, and can be created based on application runtimes defined in the deployment directory. As such, each test group can correspond to one of the plurality of application runtimes (e.g., CICS, IMS, and Batch) on the mainframe rehosting platform.

The test manager can provide a plurality of panels in the web user interface, for the end user to view test units 336, 338, and 341 in each test group, and to organize the test units in each test group into one or more test scenarios 343, 345, and 347.

Each test scenario includes one or more test units (e.g., jobs or screens) that is linked into a sequence representing a business scenario. The linking can be performed manually by an end user through a web user interface at the test manager, or can be performed automatically by the test manager in response to a user-defined trigger.

The one or more test scenarios from each test group can constitute a test plan 349, 351, and 353. Each test plan can be linked to a test execution driver 329. The test execution driver can execute the test plan against a migrated mainframe application in the mainframe rehosting platform.

Figure 4:
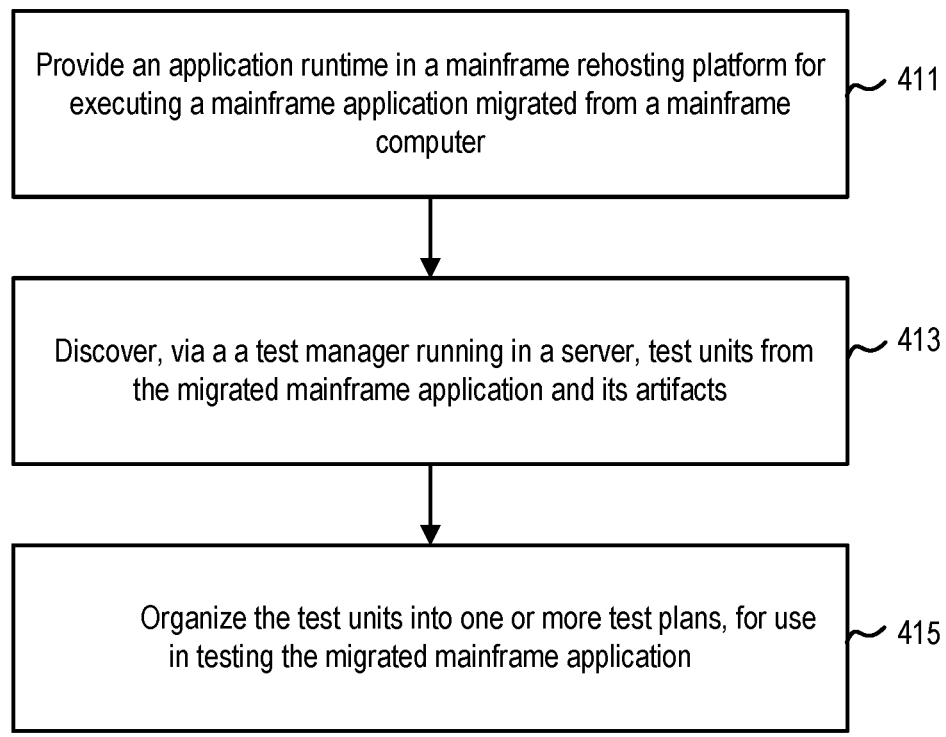
FIG. 4 illustrates a method for generating testing plans for testing a migrated application, in accordance with an embodiment.

FIG. 4 illustrates a method for generating testing plans for testing a migrated application, in accordance with an embodiment.

At step 411, an application runtime in a mainframe rehosting platform for executing a mainframe application migrated from a mainframe computer is provided.

At step 413, test units are discovered from the migrated mainframe application and its artifacts using a test manager running in a server.

At step 415, the test units are organized into one or more test plans, for use in testing the migrated mainframe application.

Replaying Captured Baseline Execution

The test manager can be used to capture a baseline from an online execution against a mainframe platform at the network data stream layer, and to drive both execution against the rehosting platform and automated comparison of the results.

To automate the testing, the test manager enables capturing the baseline during mainframe interactions, and then replaying it against rehosted transactions in the mainframe rehosting platform and comparing the corresponding data streams and screens, to determine the migration success of the mainframe application.

Screen fields expected to be different can be defined by the test manager, so that they can be automatically filtered from comparison against the mass of test cases to reduce false negatives.

The test manager can capture baseline execution of a mainframe application in the mainframe platform, and replay the captured baseline execution against the rehosting platform, with the option of manually adding test cases.

A set of processes can be used to set up the test environment and load data therein. The test baseline capture would need to cover the following:

(1). For batch applications, the test manager can capture regular and IMS batch jobs execution sequences together with input files and output files, and convert this sequence into one that can be replayed on the rehosting platform.

(2). For interactive online transactions, tn3270 interactions for CICS or IMS and responses can be captured, and converted to automated replay scripts for ART CICS or IMS.

(3). For message-driven online transactions, MQ message interactions for CICS or IMS can be captured.

In accordance with an embodiment, as part of test execution, results comparison can be automated. Based on the results captured on the mainframe and transferred/converted as needed, the following can be compared:

(1). Terminal (e.g., tn3270) screens. The terminal screens can be compared at data stream trace level, window bitmaps, or by data fields, messages;

(2). files (VSAM and sequential);

(3). database changes.

In accordance with an embodiment, as with the rehosting workbench that provides a life-cycle methodology (from Import to Deploy/Run), the ART test manager can integrate these capabilities under a unifying life-cycle. The life-cycle can have two independent entry points that can later be linked together:

(1). Test units generation from the ART workbench information, the test units linked to form test scenarios that comprise the test plan;

(2). Baseline capture and import of mainframe test scenarios and reference results.

In accordance with an embodiment, once both of these are completed, the captured baseline test scenarios and their results can be linked with test units/scenarios in the generated test plan. After these preparation tasks are completed, end users can define test campaigns (groups of test scenarios to be executed) and use the test scenario-linked playback information to drive test execution process and results comparison, followed by creation of issues when results do not match as expected. Since the end users may want to propagate some issues (after verification) into an external issue tracking system, a user exit mechanism can be provided to enable this. End users can select from a list of issues based on some criteria/filtering to define the next test campaign to re-test the fixed load.

Figure 5:
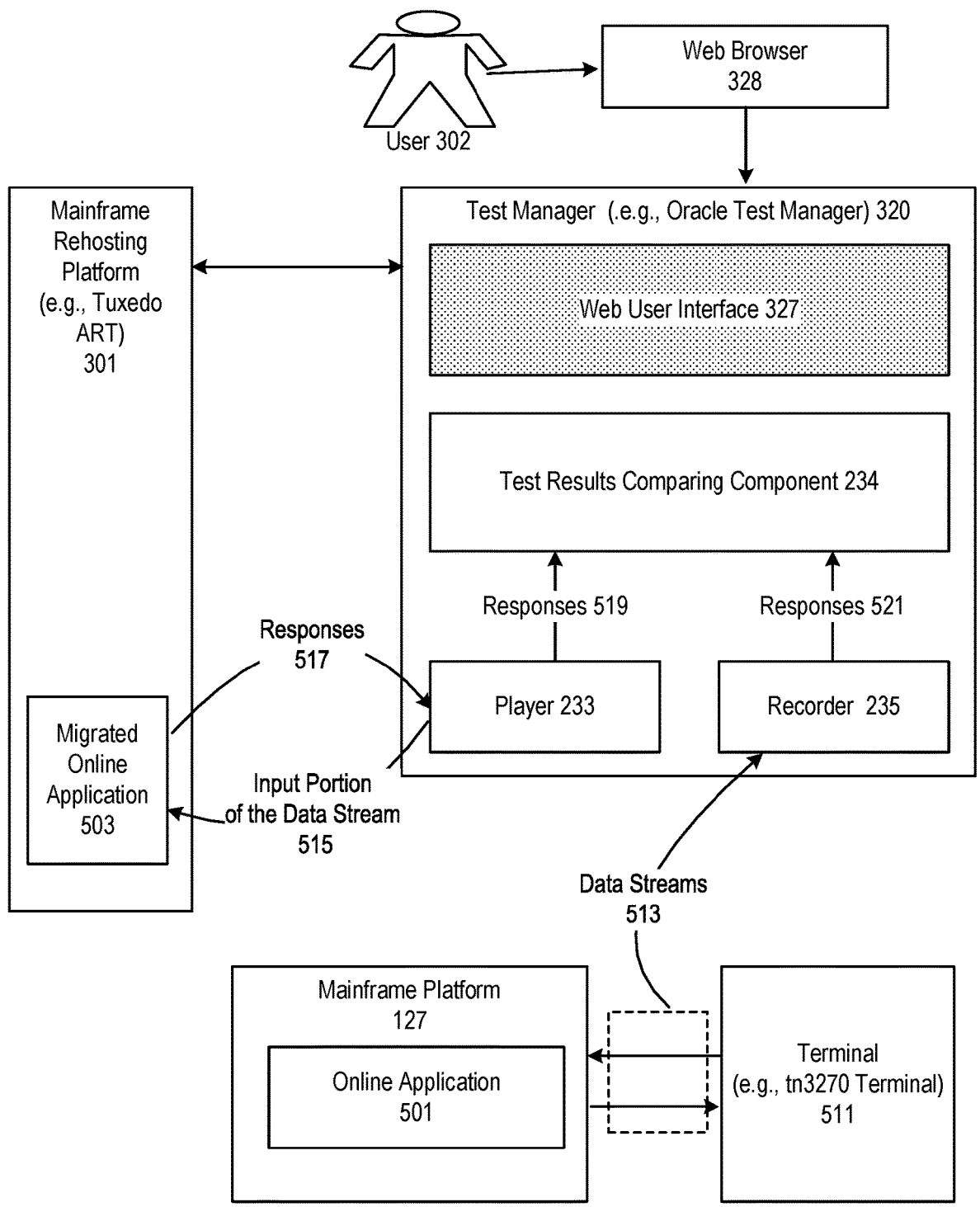
FIG. 5 illustrates a system for replaying a captured baseline execution against a rehosting platform, in accordance with an embodiment.

FIG. 5 illustrates a system for replaying a captured baseline execution against a rehosting platform, in accordance with an embodiment.

Online mainframe transactions often involve user interactions via tn3270 terminal emulators or "screen scraping" 3270 interactions into an alternate UI.

To automate screen testing, the test manager can provide tn3270 record-and-replay capability coupled with automated results comparison.

As shown in FIG. 5, a test manager 320 can be provided between a web browser 328 and a mainframe rehosting platform (e.g., TUXEDO ART) 301.

In accordance with an embodiment, a rehosting workbench can be used to automate migration of mainframe applications using migration tools in the rehosting workbench, from a mainframe system to the rehosting platform (open platform). The migrated artifacts includes code and data, for example COBOL programs, copybooks, basic mapping support (BMS) screens, job control language (JCL), and DB2 DDL. The code and data can be transferred from the mainframe system to the rehosting workbench, which can parse source objects, calculate dependencies, generate metadata, and produce reports to indicate any missing objects or unused ones in the code and data.

The test manager can be configured to automate and speed up testing of the migrated mainframe applications. The test manager can run on a web server, and can be accessed by end users (e.g., user 302) through the web browser. The test manager can provide the end users with end-to-end capabilities, from creating test plans to executing test cases, capturing and comparing test results, and providing a tracking dashboard.

In accordance with an embodiment, a web user interface (UI) 327 can be provided in the test manager for user interaction, and includes built-in features, such as authentication, access control, and auditing.

The test manager can capture a baseline execution (test baseline) of a mainframe online application in the mainframe platform, and replay the captured baseline execution against the rehosting platform, with the option of manually adding test cases.

For an interactive/online transactions, the captured test baseline includes terminal (e.g., tn3270 terminal) interactions for CICS or IMS, and responses; for message-driven online transactions, the captured test baseline includes MQ message interactions for CICS or IMS.

The test manager can convert the captured test baseline to automated replay scripts for ART CICS or IMS.

In accordance with an embodiment, when comparing results from the captured baseline with those generated from a replay of the captured baseline against the open platform (target platform), the test manager can compare:

(1). terminal (e.g., tn3270 terminal) screens. The terminal screens can be compared at data stream trace level, window bitmaps, or by data fields, messages;

(2). files (Virtual Storage Access Method/VSAM files and sequential files); and (3). database changes.

In accordance with an embodiment, an online mainframe application 501 can be executed via a terminal emulator 511. A recorder 235 (e.g., tn3270 recorder) in the test manager can capture a test baseline execution of the online application by recording terminal data stream 513 exchanged between the terminal and the online application.

The test manager then replays the input part of the captured data stream 515 against the same transactions and screens associated with the migrated online application 503 running in the mainframe rehosting platform, capture the responses 517, and compare the responses 519 against the recorded mainframe responses 521. This enables the test manager to automatically replay and verify a sequence of screen interactions against rehosted transactions.

In accordance with an embodiment, if there are differences, the test manager shows the fields that do not match in a detailed list and in a side-by-side screen capture view. If the differences are expected (for example, if the test baseline capturing and replaying were performed at different times and screens include date and time information), users can mark selected fields or specify certain patterns, for use by the test manager to filter the marked fields or specified patterns out of any future comparisons, so that test cases can be marked "Passed" barring any other differences.

Figure 6:
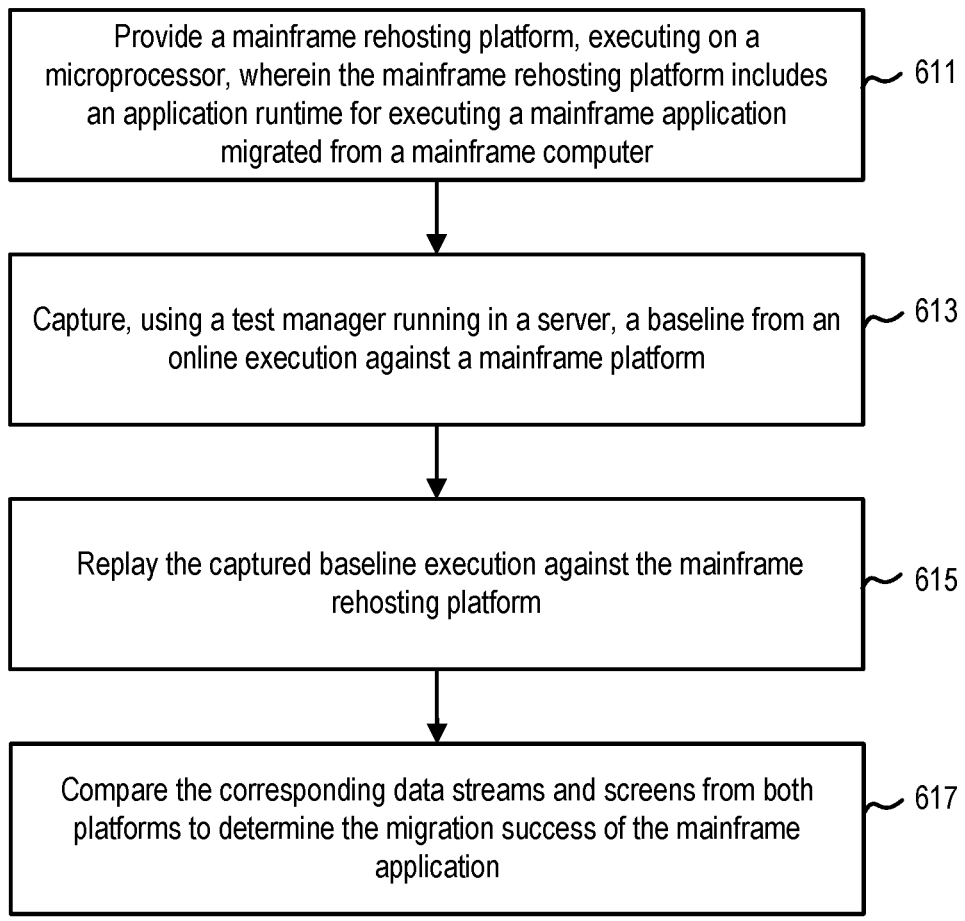
FIG. 6 illustrates a method for replaying a captured baseline execution against a rehosting platform, in accordance with an embodiment.

FIG. 6 illustrates a method for replaying a captured baseline execution against a rehosting platform, in accordance with an embodiment.

As shown in FIG. 6, at step 611, a mainframe rehosting platform executing on a microprocessor is provided, wherein the mainframe rehosting platform includes an application runtime for executing a mainframe application migrated from a mainframe computer.

At step 613, a test manager running in a server is used to capture a baseline from an online execution against a mainframe platform.

At step 615, the captured baseline execution is replayed against the mainframe rehosting platform.

At step 617, corresponding data streams and screens from both platforms are compared to determine the migration success of the mainframe application.

Comparison of Output Files and Return Codes

The test manager can further be configured to execute batch jobs against both the mainframe platform and the rehosting platform and compare the results from both platforms, including identifying output files, and downloading, converting, and comparing the output files automatically to determine if the batch jobs results match. In addition, database updates and return codes from the mainframe and migrated job can be compared to determine the migration success of a mainframe application or job.

In batch testing, much of the effort goes to comparing file and database changes to ensure the jobs produced the same results in both environments. To automate these tasks, Test Manager provides advanced features to run a Z/OS version of each batch job, collecting its results, including files and DB updates for automated comparison.

File and DB compare functions can be enabled for each batch test group, by providing Z/OS FTP and DB2 connection information. After the rehosted job completes in the test environment, the test manager can launch the Z/OS version of the same job through an FTP connection, then download and convert data files for comparison with the files produced on ART for Batch.

In the Results view, the File Compare tab lists the job's files and shows any differences with the ones from Z/OS. The DB compare tab shows the sequence of database operations (except for Reads) and before and after column values for ORACLE and DB2. The test manager can collapse matching operations with matching values, so only the differences are shown for user's analysis.

If test results do not match, additional diagnostic information is available in the test manager results view, including job logs and server traces.

IMS batch cases can be imported and run in two ways: through batch cases in batch test group with a JCL step that includes DFSRRC00 launcher for IMS, or directly as IMS BMP programs in the IMS test group. Running BMP programs that use DB2 and/or GSAM files would enable using the file and DB compares available in batch test groups.

Batch jobs on the mainframe are typically driven by various schedulers, but they all generate syslog entries. So the easiest and common place that reflects a specific sequence of batch jobs would be the mainframe JES syslog.

Thus, a relevant syslog for a sequence of test batch jobs can be captured and transferred to the ART environment, where the test manager can extract the required information on the jobs and steps that make up a specific test sequence as well as step and job return codes.

Information on required file inputs and outputs for each job can also be captured. Then, the job sequence extracted from the mainframe syslog can be combined with this information to enable the test manager to annotate the batch scenarios, and to generate JCL jobs to capture/save all input files at the beginning of the sequence. The test manager can also be enabled to capture all output files at the end of the sequence, and to transfer these files to the target test environment.

These jobs can then be transferred to the mainframe platform. A capture process can be initiated by running an input files capture job, which can trigger the test sequence. The test sequence includes running an output capture job to capture output files, and running the FTP job to transfer the files down to the target test environment, i.e. the mainframe rehosting platform. Non-file activities, e.g., database updates, MQ messages sent out, can also be captured.

Once the defined sequence of jobs and all inputs available for that sequence have been captured, a test case or a test scenario can be generated to drive the same sequence on the target test environment. This can be in a form of a script configured to submit the jobs with artjesadmin and to evaluate return condition codes against the ones found in the mainframe syslog.

A results comparison job can be created to compare all file outputs captured from the mainframe with the ones generated by running the test scenario on the target environment, using OS comparison tools, such as LINUX "cmp". The test manager can use the rehosting workbench to generate transcoding programs, and then use them in the comparison job to transcode the output files FTP'd from the mainframe.

For VSAM KSDS files, the index sequence of keys may be impacted by differences in ASCII and EBCDIC collating sequence (sort order). To ensure that identical binary data for "cmp" comparison are obtained, a step to flatten VSAM files by using IDCAMS REPRO to copy them to a flat file may be needed.

Figure 7:
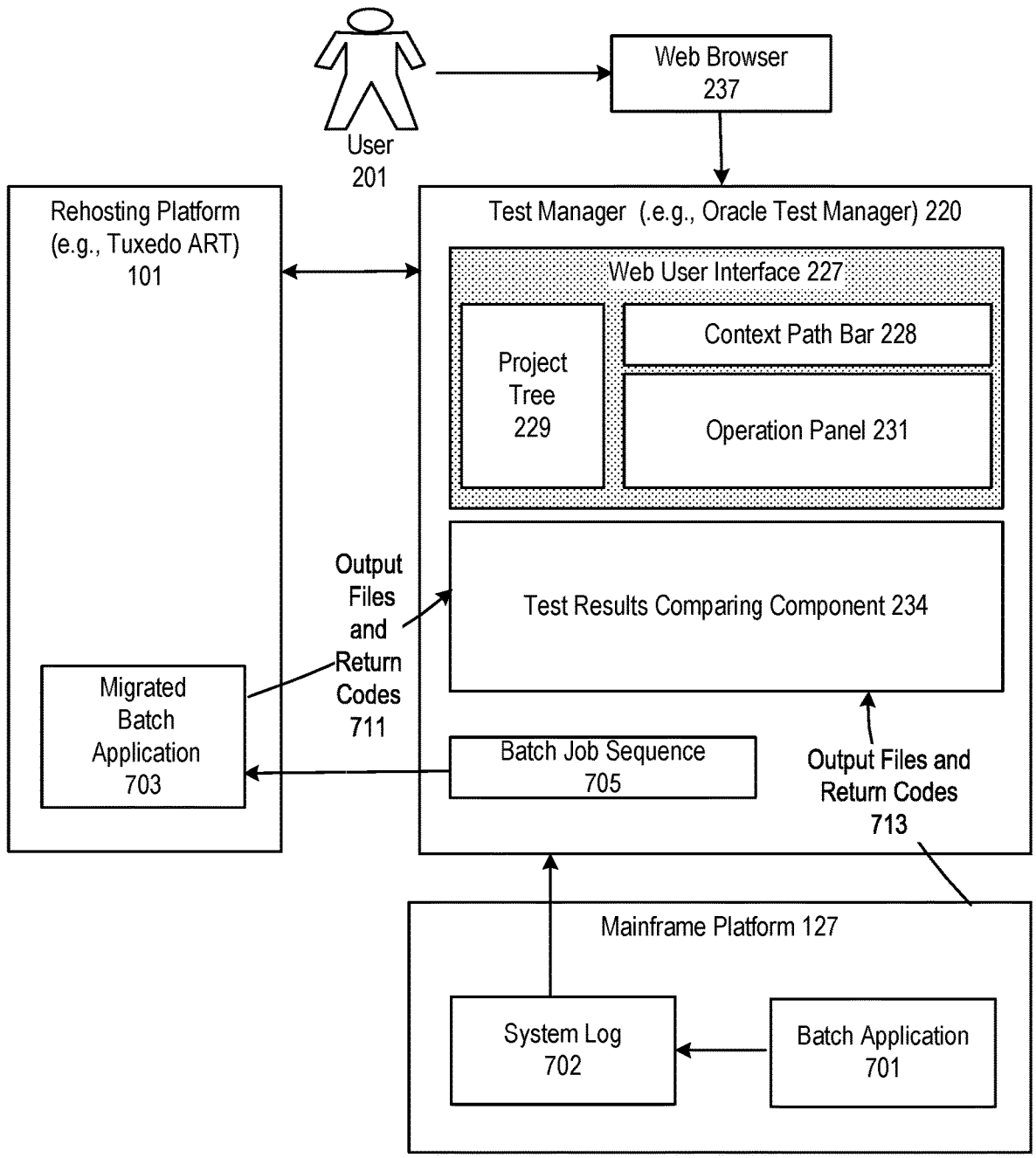
FIG. 7 illustrates a system for comparing output files to determine the migration success of a batch application, in accordance with an embodiment.

FIG. 7 illustrates a system for comparing output files to determine the migration success of a batch application, in accordance with an embodiment.

As shown in FIG. 7, a batch application 701 on the mainframe platform can generate a system log 702 after a plurality of batch jobs are submitted to the mainframe platform.

The test manager can extract a batch job sequence 705 from the system log, and submit the batch job sequence to a migrated batch application 703 on the mainframe rehosting platform.

The output files and return codes 711 and 713 from both platforms can be downloaded to the test manager, for use by the test results comparing component to determine whether the output files and return codes from both platforms match. If they match, the migration of the batch application is successful; otherwise, the migration of the batch application is not successful. To the extent there is variation between output files and return codes from both platforms, those variation can be examined to determine whether the variations are expected (and/or can be ignored) or whether the variations require modifications to the migrated applications. The results of the comparison operation may be displayed to a user for processing and analysis.

Figure 8:
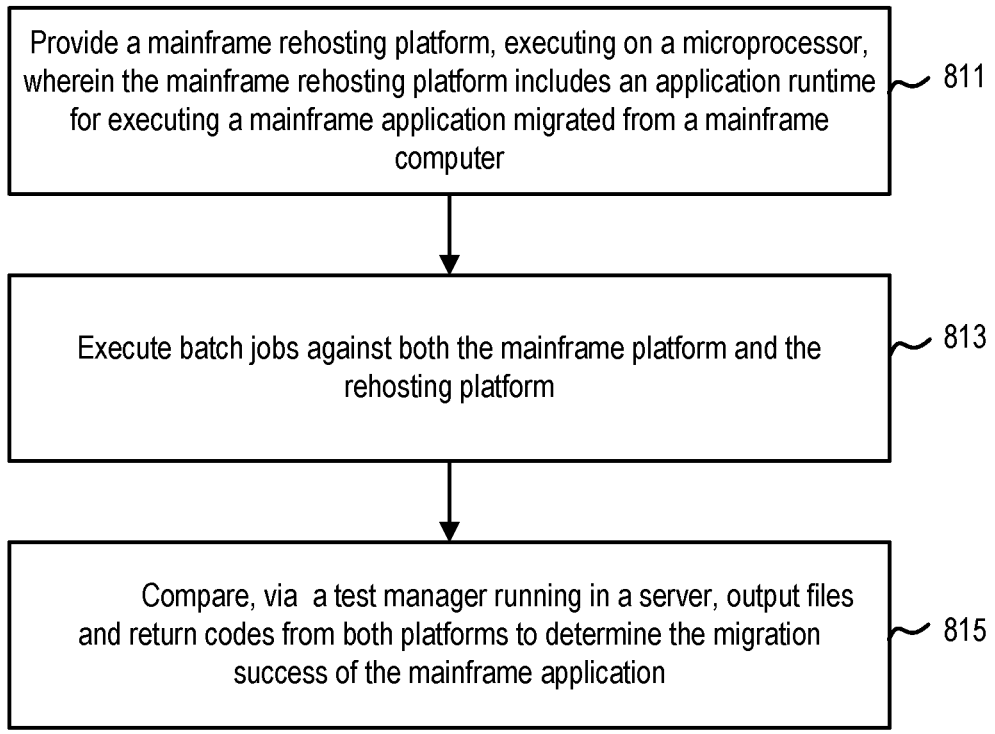
FIG. 8 illustrates a method for comparing output files to determine the migration success of a batch application, in accordance with an embodiment.

FIG. 8 illustrates a method for comparing output files to determine the migration success of a batch application, in accordance with an embodiment. As shown in FIG. 8, at step 811, a mainframe rehosting platform executing on a microprocessor is provided, wherein the mainframe rehosting platform includes an application runtime for executing a mainframe application migrated from a mainframe computer. At step 813, batch jobs are executed against both the mainframe platform and the rehosting platform. At step 815, a test manager running in a server is used to compare output files and return codes from both platforms to determine the migration success of the mainframe application.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium includes, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A method for automatically generating test plans using a test manager, the method comprising:
    providing a plurality of application runtimes in a mainframe rehosting platform for executing a plurality of mainframe applications migrated from a mainframe computer;
    discovering, via a test manager running in a server, test units from the plurality of migrated mainframe applications, wherein the test units comprise:
        asset-based test units generated from artifacts of the plurality of migrated mainframe applications based on configuration files of the plurality of migrated mainframe applications; and
        risk-based test units generated from conversion rules that define changes made to the plurality of mainframe applications for executing the plurality of mainframe applications on the mainframe rehosting platform;
    capturing, via the test manager, sequences of jobs from a mainframe scheduler operating on the mainframe computer;
    generating, via the test manager based on the captured sequences of jobs, test plan sequences for automatic execution against the mainframe rehosting platform;
    automatically organizing the asset-based test units and the risk-based test units into test plans by:
        creating a plurality of test groups, each of the plurality of test groups corresponding to one of the plurality of application runtimes of the mainframe rehosting platform;
        storing the asset-based test units and the risk-based test units in the plurality of test groups;
        organizing a first set of the asset-based and the risk-based test units stored in a first test group corresponding to a first mainframe application executable in a first application runtime of the mainframe rehosting platform into a first plurality of test scenarios;
        linking selected ones of the first plurality of test scenarios into a first test plan; and
        linking the first test plan with a test execution driver; and
    automatically testing the first mainframe application migrated from the mainframe computer by automatically executing the first test plan against the migrated mainframe application in the first application runtime of the plurality of application runtimes of the mainframe rehosting platform.

2. The method of claim 1, wherein:
    the asset-based test units comprise batch test units and online test units; and
    the risk-based test units comprise a test unit for validating application of a rule across programs in the plurality of mainframe applications migrated from the mainframe computer.

3. The method of claim 1, further comprising:
    capturing by the test manager the sequences of jobs from the mainframe scheduler using a test driver; and
    turning the sequences of jobs into the test plan sequences for automatic execution against the rehosting platform.

4. The method of claim 1, further comprising:
    capturing by the test manager a baseline from an online execution against a mainframe platform;
    replaying by the test manager the captured baseline execution against the mainframe rehosting platform; and
    comparing by the test manager corresponding data streams and screens from both of the mainframe platform and the mainframe rehosting platform to determine the migration success of the first mainframe application migrated from the mainframe computer.

5. The method of claim 1, further comprising:
    executing by the test manager batch jobs against both the mainframe computer and the mainframe rehosting platform; and
    comparing by the test manager output files and return codes from both of the mainframe computer and the mainframe rehosting platform, to determine the migration success of the first mainframe application migrated from the mainframe computer.

6. The method of claim 5, further comprising automatically filtering from the comparison of the output files and the return codes defined screen fields expected to be different to reduce false negatives of the determined migration success of the first mainframe application migrated from the mainframe computer.

7. The method of claim 1, wherein:
    the discovering comprises discovering test units from a migrated online application;
    the automatically organizing comprises automatically organizing the asset-based test units and the risk-based test units into the test plans by:
        organizing a second set of the asset-based and the risk-based test units stored in a second test group corresponding to a second application runtime of the plurality of application runtimes in the mainframe rehosting platform into a second plurality of test scenarios;
        linking selected ones of the second plurality of test scenarios into a second test plan; and
        linking the second test plan with the test execution driver; and
    the automatically testing comprises automatically testing the online application migrated from the mainframe computer by automatically executing the second test plan against the migrated online application in the second application runtime of the mainframe rehosting platform.

8. A system automatically generating test plans using a test manager, the system comprising:
    a microprocessor;
    a mainframe rehosting platform, executing on the microprocessor, wherein the mainframe rehosting platform comprises a plurality of application runtimes for executing a plurality of mainframe applications migrated from a mainframe computer; and a test manager running in a server, wherein the test manager is configured to automatically discover test units from the plurality of migrated mainframe applications, wherein the test units comprise:
    asset-based test units generated from artifacts of the plurality of migrated mainframe applications based on configuration files of the plurality of migrated mainframe applications; and
    risk-based test units generated from conversion rules that define changes made to the plurality of mainframe applications for executing the plurality of mainframe applications on the mainframe rehosting platform,
wherein the test manager is configured to capture sequences of jobs from a mainframe scheduler operating on the mainframe computer;
wherein the test manager is configured to generate, based on the captured sequences of jobs, test plan sequences for automatic execution against the mainframe rehosting platform;
wherein the test manager is configured to automatically organize the asset-based test units and the risk-based test units into test plans by:
    creating a plurality of test groups, each of the plurality of test groups corresponding to one of the plurality of application runtimes of the mainframe rehosting platform;
    storing the asset-based test units and the risk-based test units in the plurality of test groups;
    organizing a first set of the asset-based and risk-based test units stored in a first test group corresponding to a first mainframe application executable in a first application runtime of the mainframe rehosting platform into a first plurality of test scenarios;
    linking selected ones of the first plurality of test scenarios into a first test plan; and
    linking the first test plan with a test execution driver;
wherein the test execution driver is configured to automatically test the first mainframe application migrated from the mainframe computer by automatically executing the first test plan against the migrated mainframe application in the first application runtime of the plurality of application runtimes of the mainframe rehosting platform.

9. The system of claim 8, wherein:
the asset-based test units comprise batch test units and online test units; and
the risk-based test units comprise a test unit for validating application of a rule across programs in the plurality of mainframe applications migrated from the mainframe computer.

10. The system of claim 8, wherein the test manager is further configured to:
capture the sequences of jobs from the mainframe scheduler using a test driver; and
turn the sequences of jobs into the test plan sequences for automatic execution against the rehosting platform.

11. The system of claim 8, wherein the test manager is further configured to:
capture a baseline from an online execution against a mainframe platform;
replay the captured baseline against the mainframe rehosting platform; and
compare corresponding data streams and screens from both of the mainframe platform and the mainframe rehosting platform to determine the migration success of the first mainframe application migrated from the mainframe computer.

12. The system of claim 8, wherein the test manager is further configured to execute batch jobs as test cases against both the mainframe computer and the mainframe rehosting platform and compare output files and return codes from both of the mainframe computer and the mainframe rehosting platform, to determine the migration success of the first mainframe application migrated from the mainframe computer.

13. The system of claim 12, wherein the test manager is further configured to automatically filter from the comparison of the output files and the return codes defined screen fields expected to be different to reduce false negatives of the determined migration success of the first mainframe application migrated from the mainframe computer.

14. The system of claim 8, wherein:
the test manager is configured to automatically organize the asset-based test units and the risk-based test units into the test plans by:
    organizing a second set of the asset-based and risk-based test units stored in a second test group corresponding to a second application runtime of the mainframe rehosting platform into a second plurality of test scenarios;
    linking selected ones of the second plurality of test scenarios into a second test plan; and
    linking the second test plan with the test execution driver;
the test execution driver is configured to automatically test the first mainframe application migrated from the mainframe computer by automatically executing the second test plan against the migrated mainframe application in the a second application runtime of the plurality of application runtimes of the mainframe rehosting platform.

15. A non-transitory computer-readable storage medium storing a set of instructions for automatically generating test plans using a test manager, said instructions, when executed by a processor, causing the processor to perform steps comprising:
providing a plurality of application runtimes in a mainframe rehosting platform for executing a plurality of mainframe applications migrated from a mainframe computer;
discovering, via a test manager running in a server, test units from the plurality of migrated mainframe applications, wherein the test units comprise:
    asset-based test units generated from artifacts of the plurality of migrated mainframe applications based on configuration files of the plurality of migrated mainframe applications; and
    risk-based test units generated from conversion rules that define changes made to the plurality of mainframe applications for executing the plurality of mainframe applications on the mainframe rehosting platform;
capturing, via the test manager, sequences of jobs from a mainframe scheduler operating on the mainframe computer;
generating, via the test manager based on the captured sequences of jobs, test plan sequences for automatic execution against the mainframe rehosting platform;
automatically organizing the asset-based test units and/or the risk-based test units into test plans by:

creating a plurality of test groups, each of the plurality of test groups corresponding to one of the plurality of application runtimes of the mainframe rehosting platform;

storing the asset-based test units and the risk-based test units in the plurality of test groups;

organizing a first set of the test units stored in a first test group corresponding to a first mainframe application executable in a first application runtime of the mainframe rehosting platform into a first plurality of test scenarios;

linking selected ones of the first plurality of test scenarios into a first test plan; and linking the first test plan with a test execution driver; and automatically testing the first mainframe application migrated from the mainframe computer by automatically executing the first test plan against the migrated mainframe application in the first application runtime of the plurality of application runtimes of the mainframe rehosting platform.

16. The non-transitory computer-readable storage medium of claim 15, wherein:

the asset-based test units comprise batch test units and online test units; and the risk-based test units comprise a test unit for validating application of a rule across programs in the plurality of mainframe applications migrated from the mainframe computer.

17. The non-transitory computer-readable storage medium of claim 15, further comprising:

capturing by the test manager the sequences of jobs from the mainframe scheduler using a test driver; and turning the sequences of jobs into the test plan sequences for automatic execution against the rehosting platform.

18. The non-transitory computer-readable storage medium of claim 15, further comprising:

capturing by the test manager a baseline from an online execution against a mainframe platform;

replaying by the test manager the captured baseline execution against the mainframe rehosting platform; and comparing by the test manager corresponding data streams and screens from both of the mainframe platform and the mainframe rehosting platform to determine the migration success of the first mainframe application migrated from the mainframe computer.

19. The non-transitory computer-readable storage medium of claim 15, further comprising:

executing by the test manager batch jobs as test cases against both the mainframe computer and the mainframe rehosting platform; and comparing by the test manager output files and return codes from both of the mainframe computer and the mainframe rehosting platform, to determine a migration success of the first mainframe application migrated from the mainframe computer.

20. The non-transitory computer-readable storage medium of claim 19, wherein:

the discovering comprises discovering test units from a migrated online application; and defined screen fields expected to be different are automatically filtered by the test manager from the comparison of the output files and the return codes to reduce false negatives of the determined migration success of the first mainframe application migrated from the mainframe computer;

the automatically organizing comprises automatically organizing the asset-based test units and the risk-based test units into the test plans by:

organizing a second set of the asset-based and the risk-based test units stored in a second test group corresponding to a second application runtime of the plurality of application runtimes in the mainframe rehosting platform into a second plurality of test scenarios;

linking selected ones of the second plurality of test scenarios into a second test plan; and linking the second test plan with the test execution driver; and the automatically testing comprises automatically testing the online application migrated from the mainframe computer by automatically executing the second test plan against the migrated online application in the second application runtime of the mainframe rehosting platform.

* * * * *

UNITED STATES PATENT AND TRADEMARK OFFICE
CERTIFICATE OF CORRECTION

PATENT NO. : 11,042,471 B2  
APPLICATION NO. : 16/110173  
DATED : June 22, 2021  
INVENTOR(S) : Rakhmilevich et al.

Page 1 of 1

It is certified that error appears in the above-identified patent and that said Letters Patent is hereby corrected as shown below:

In the Drawings

On sheet 2 of 8, in FIGURE 2, under Reference Numeral 220, Line 1, delete "(.e.g.," and insert -- (e.g., --, therefor.

On sheet 3 of 8, in FIGURE 3, under Reference Numeral 320, Line 1, delete "(.e.g.," and insert -- (e.g., --, therefor.

On sheet 5 of 8, in FIGURE 5, under Reference Numeral 320, Line 1, delete "(.e.g.," and insert -- (e.g., --, therefor.

On sheet 7 of 8, in FIGURE 7, under Reference Numeral 220, Line 1, delete "(.e.g.," and insert -- (e.g., --, therefor.

In the Specification

In Column 9, Line 8, delete "the a" and insert -- a --, therefor.

In Column 9, Line 10, after "application" insert -- . --.

In Column 18, Line 25, after "may" insert -- be --.

In the Claims

In Column 22, Line 36, in Claim 14, delete "the a" and insert -- a --, therefor.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*